United States Patent
Jin et al.

(10) Patent No.: US 7,886,180 B2
(45) Date of Patent: Feb. 8, 2011

(54) RECOVERY IN A DISTRIBUTED STATEFUL PUBLISH-SUBSCRIBE SYSTEM

(75) Inventors: Yuhui Jin, Bellevue, WA (US); Robert Evan Strom, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 1418 days.

(21) Appl. No.: 10/846,196

(22) Filed: May 14, 2004

(65) Prior Publication Data

US 2005/0268146 A1 Dec. 1, 2005

(51) Int. Cl.
*G06F 11/00* (2006.01)
(52) U.S. Cl. ............... 714/2; 714/4; 714/13; 714/20; 709/223; 709/224
(58) Field of Classification Search .............. 714/2, 714/13, 20
See application file for complete search history.

(56) References Cited

U.S. PATENT DOCUMENTS

| | | | |
|---|---|---|---|
| 5,091,918 A | 2/1992 | Wales | |
| 5,870,605 A | 2/1999 | Bracho et al. | |
| 5,940,372 A | 8/1999 | Bertin et al. | |
| 5,974,417 A | 10/1999 | Bracho et al. | |
| 5,987,455 A | 11/1999 | Cochrane et al. | |
| 6,021,443 A | 2/2000 | Bracho et al. | |
| 6,118,786 A | 9/2000 | Tiernan et al. | |
| 6,421,359 B1 | 7/2002 | Bennett et al. | |
| 6,502,213 B1 * | 12/2002 | Bowman-Amuah | 714/49 |
| 6,510,429 B1 | 1/2003 | Todd | |
| 6,643,682 B1 | 11/2003 | Todd et al. | |
| 6,681,220 B1 | 1/2004 | Kaplan et al. | |
| 6,748,555 B1 * | 6/2004 | Teegan et al. | 714/38 |
| 6,748,583 B2 * | 6/2004 | Aizenbud-Reshef et al. | 717/127 |
| 6,859,438 B2 | 2/2005 | Haddock et al. | |
| 6,983,463 B1 | 1/2006 | Hunt | |
| 6,996,625 B2 | 2/2006 | Kaplan et al. | |
| 7,010,538 B1 | 3/2006 | Black | |
| 7,162,524 B2 * | 1/2007 | Astley et al. | 709/226 |

(Continued)

OTHER PUBLICATIONS

Bhola et al., "Exactly-Once Delivery in a Content-based Publish Subscribe System", 2002, Proceedings of the International Conference on Dependable Systems and Network (DSN'02).*

(Continued)

*Primary Examiner*—Christopher S McCarthy
(74) *Attorney, Agent, or Firm*—Yee & Associates, P.C.; Louis J. Percello

(57) ABSTRACT

Method, apparatus and computer program product for fault recovery in a distributed stateful publish-subscribe system. The system includes the capability of recovering from failures that may occur when a stateful publish-subscribe service is implemented on an overlay network. Such failures may include, for example, temporary crashes of broker machines, and network errors causing messages to possibly be lost, duplicated or delivered out of order. The system requires stable storage logging only when a published event enters the system, and requires that logged messages be retrieved from stable storage only in the event all brokers between a failed link or broker and the publishing sites have failed. The publish-subscribe system of the present invention does not require that broker-to-broker connections use reliable FIFO protocols, such as TCP/IP, but may advantageously use faster, less reliable protocols.

16 Claims, 6 Drawing Sheets

U.S. PATENT DOCUMENTS

| | | | |
|---|---|---|---|
| 7,177,859 | B2 | 2/2007 | Pather et al. |
| 7,349,980 | B1 | 3/2008 | Darugar et al. |
| 7,360,202 | B1 | 4/2008 | Seshadri et al. |
| 7,392,279 | B1 | 6/2008 | Chandran et al. |
| 7,406,537 | B2 | 7/2008 | Cullen |
| 2001/0049743 | A1 | 12/2001 | Phippen et al. |
| 2002/0069244 | A1 | 6/2002 | Blair et al. |
| 2003/0067874 | A1 | 4/2003 | See et al. |
| 2004/0039786 | A1 | 2/2004 | Horvitz et al. |
| 2004/0107290 | A1 | 6/2004 | Kaplan et al. |
| 2004/0196837 | A1 | 10/2004 | Cinkler |
| 2005/0010765 | A1 | 1/2005 | Swander et al. |
| 2006/0067231 | A1 | 3/2006 | Ikoma et al. |
| 2006/0195896 | A1 | 8/2006 | Fulp et al. |
| 2006/0200333 | A1 | 9/2006 | Dalal et al. |
| 2006/0294219 | A1 | 12/2006 | Ogawa et al. |
| 2007/0002750 | A1 | 1/2007 | Sang et al. |
| 2007/0116822 | A1 | 5/2007 | Prakash et al. |
| 2008/0209440 | A1 | 8/2008 | Ginis et al. |
| 2008/0239951 | A1 | 10/2008 | Strom |
| 2008/0244025 | A1 | 10/2008 | Ginis et al. |
| 2008/0301053 | A1 | 12/2008 | Tserkovny et al. |
| 2009/0187641 | A1 | 7/2009 | Li et al. |

OTHER PUBLICATIONS

U.S. Appl. No. 11/475,708, filed Jun. 27, 2006, Strom.

Babcock et al., "Distributed Top-K Monitoring", SIGMOD 2003, Jun. 2003, San Diego, CA, ACM 1-58113-634-X/03/06, pp. 1-12.

Bertsekas, "Dynamic Programming and Optimal Control", vol. II, Athena Scientific, 1995, pp. 184, 186, 203, 204 and 207.

Ginis et al., Continuous Feedback-Controlled Deployment of Message Transforms in a Distributed Messaging System, May 7, 2004.

Ginis et al., Distributed Messaging System Supporting Stateful Subscriptions, May 7, 2004.

Hwang et al., "A Comparison of Stream-Oriented High-Availability Algorithms", Brown University, http://www.cs.brown.edu/publications/techreports/reports/CS-03-17.html, Sep. 2003. pp. 1-13.

Madden et al., "Fjording the Stream: An Architecture for Queries over Streaming Sensor Data", Proceedings of the 18th International Conference on Data Engineering, Jun. 26, 2001. pp. 1-25.

Gehrke et al., "On Computing Correlated Aggregates Over Continual Data Streams", Proceedings of the 2001 ACM SIGMOD International Conference on Management of Data, May 21-24, 2001, 12 pages.

Babu et al., "Continuous Queries over Data Streams", Stanford University, vol. 30, Issue 3, Sep. 2001, 12 pages.

Datar et al., "Maintaining Stream Statistics over Sliding Windows", Stanford University, Proceedings of the thirteenth annual ACM-SIAM Symposium on Discrete algorithms, ISBN: 0-89871-513-X, Jul. 30, 2001, pp. 1-10 and Appendix i-iii.

Babcock et al., "Models and Issues in Data Stream Systems", Proceedings of the twenty-first ACM SIGMOD-SIGACT-SIGART Symposium on Principles of database systems, Mar. 9, 2002, pp. 1-30.

Carney et al., "Monitoring Streams—A New Class of DBMS Applications", Technical Report CS-02-1, Department of Computer Science, Brown University, Feb. 2002, pp. 1-25.

Chandrasekaran et al., "Streaming Queries over Streaming Data", Proceedings of the 28th VLDB Conference, Hong Kong, China, 2002, 12 pages.

Carney et al., "Monitoring Streams—A New Class of Data Management Applications", Proceedings of the 28th VLDB Conference, Hong Kong, China, 2002, 12 pages.

Kang et al., "Evaluating Window Joins over Unbounded Streams", Proceedings of the 28th VLDB Conference, Hong Kong, China, 2002. 12 pages.

Madden et al., "Continuously Adaptive Continuous Queries over Streams", Proceedings of the 2002 ACM SIGMOD International Conference on Management of Data, ISBM: 1-58113-497-5, Jun. 4-6, 2002, 12 pages.

Cherniack et al., "Scalable Distributed Stream Processing", Proceedings of the 1st Blennial Conference on Innovative Data Systems Research (CIDR), 2003, 12 pages.

Motwani et al., "Query Processing, Approximation, and Resource Management in a Data Stream Management System", Stanford University, Proceedings of the 1st Biennial Conference on Innovative Data Systems Research (CIDR), 2003, pp. 1-12.

Shah et al., "Flux: An Adaptive Partitioning Operator for Continuous Query Systems", Technical Report CSD-2-1205, http://techreports.lib.berkeley.edu/accessPages/CSD-02-1205.html, University of California, Berkeley, California, Nov. 15, 2002, pp. 1-15.

Abadi et al., "Aurora: a new model and architecture for data stream management", The VLDB Journal—The International Journal on Very Large Data Bases, vol. 12, Issue 2, Aug. 2003. pp. 1-20.

Jin et al., "Relational Subscription Middleware for Internet-Scale Publish-Subscribe", DEBS 2003, ACM: 1-58113-843-1, Jun. 8, 2003, pp. 1-8.

USPTO Notice of allowance for U.S. Appl. No. 12/115,742 dated May 17, 2010.

USPTO Office action for U.S. Appl. No. 11/475,708 dated Apr. 17, 2009.

USPTO office action for U.S. Appl. No. 10/841,297 dated Aug. 20, 2008.

* cited by examiner

RECOVERY IN A DISTRIBUTED STATEFUL PUBLISH-SUBSCRIBE SYSTEM

CROSS-REFERENCE TO RELATED APPLICATIONS

The present application is related to co-pending applications entitled "CONTINUOUS FEEDBACK-CONTROLLED DEPLOYMENT OF MESSAGE TRANSFORMS IN A DISTRIBUTED MESSAGING SYSTEM", Ser. No. 10/841,297, filed on May 7, 2004; and "DISTRIBUTED MESSAGING SYSTEM SUPPORTING STATEFUL SUBSCRIPTIONS", Ser. No. 10/841,916, filed on May 7, 2004, both assigned to the same assignee, and incorporated herein by reference.

BACKGROUND OF THE INVENTION

1. Technical Field

The present invention relates generally to the field of data processing systems and, more particularly, to a method, system and computer program product for fault recovery in a distributed stateful publish-subscribe system.

2. Description of Related Art

A publish-subscribe system is a system that includes two types of clients, publisher clients and subscriber clients. A publisher client, also referred to herein as a publisher, generates messages, also referred to as events, which contain a topic and some data content. A subscriber client, also referred to herein as a client, provides, ahead of time, a criterion, also referred to as a subscription, that specifies the information, based on published messages, that the system is required to deliver to that subscriber client in the future. In a publish-subscribe system, publishers and subscribers are anonymous in that publishers do not necessarily know the number of subscribers or their locations; and subscribers do not necessarily know the locations of the publishers.

A stateless publish-subscribe system, also referred to as a topic-based or content-based publish-subscribe system, is a system in which delivered messages are a possibly filtered subset of published messages, and in which the subscription criterion is a property that can be tested on each message independent of any other message. For example, a filtered published message might be "topic=stock-ticker" or "volume>10000 & issue=IBM". A stateful publish-subscribe system, on the other hand, is a system without such restrictions. A stateful publish-subscribe system is required to support subscription criteria that depend upon computations that require multiple messages from one or more streams, for example, "Give me the highest quote of IBM within each one-minute period". In addition, a stateful system might entail delivering information that is more than simply a copy of published messages, e.g. "Tell me how many stocks fell during each one-minute period".

A stateful publish-subscribe service as used in this invention is implemented on an overlay network that comprises a collection of service machines, also referred to as brokers, that accept messages from publisher clients, deliver subscribed information to subscriber clients, and route information between publishers and subscribers. A stateful publish-subscribe system as used herein is a publish-subscribe system in which at least one subscription of the system is stateful.

An effective stateful publish-subscribe system should be fault-tolerant; i.e., it should have the ability to detect and recover from failures that may occur when a stateful publish-subscribe service is implemented on an overlay network. Such failures may include, for example, temporary crashes of broker machines, temporary losses of connectivity between broker machines, and network errors causing messages to possibly be lost, duplicated or delivered out of order.

There are known techniques in database systems in which each new published event, and the subscriber state changes derived from each new event, can be incorporated into a transaction. An implementation based upon transactions in a database system, however, is inefficient and requires an expensive "two-phase commit" protocol for every message. It would, accordingly, be advantageous to provide a fault-tolerant stateful publish-subscribe system that is efficient and that does not require a two-phase commit protocol for every message.

SUMMARY OF THE INVENTION

The present invention provides a fault-tolerant protocol for a distributed stateful publish-subscribe system. The system includes the capability of recovering from failures that may occur when a stateful publish-subscribe service is implemented on an overlay network. Such failures may include, for example, temporary crashes of broker machines, and network errors causing messages to possibly be lost, duplicated or delivered out of order. The system requires stable storage logging only when a published event enters the system, and requires that logged messages be retrieved from stable storage only in the event all brokers between a failed link or broker and the publishing sites have failed. The publish-subscribe system of the present invention does not require that broker-to-broker connections use reliable FIFO protocols, such as TCP/IP, but may advantageously use faster, less reliable protocols.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
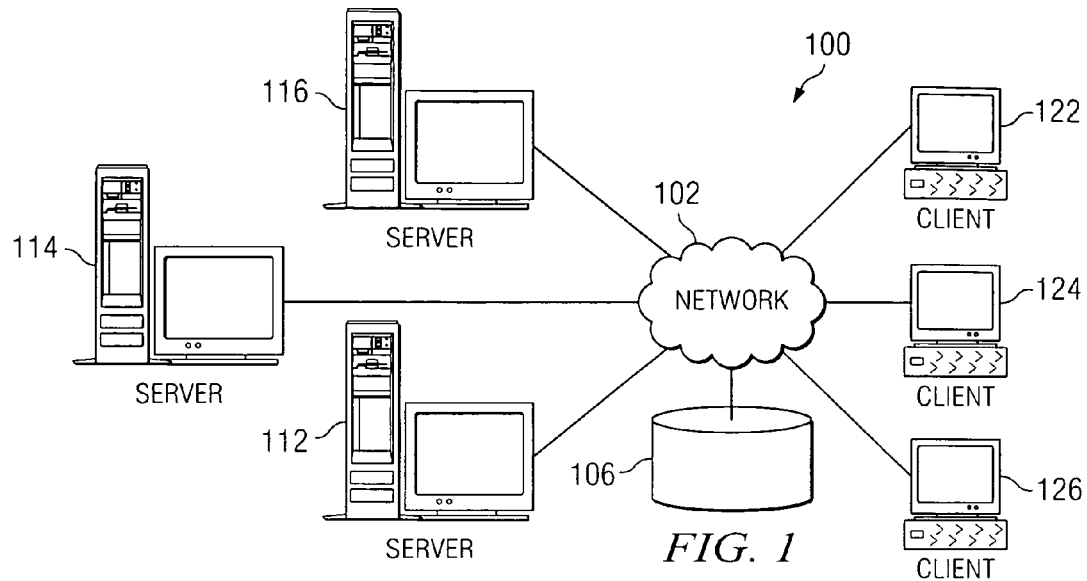
FIG. 1 depicts a pictorial representation of a network of data processing systems in which the present invention may be implemented.

With reference now to the figures, FIG. 1 depicts a pictorial representation of a network of data processing systems in which the present invention may be implemented. The network of data processing systems is designated by reference number 100, and contains a network 102, which is the medium used to provide communications links between various devices and computers connected together within network data processing system 100. Network 102 may include connections, such as wire, wireless communication links, or fiber optic cables. In the depicted example, servers 112, 114, 116 are connected to network 102 along with storage unit 106. In addition, clients 122, 124, and 126 are connected to network 102. Clients 122, 124, and 126 may, for example, be personal computers or network computers. In the depicted example, servers 112, 114, 116 provide data, such as boot files, operating system images, and applications to clients 122, 124, 126. Clients 122, 124, and 126 are clients to servers 112, 114, 116. Network data processing system 100 may include additional servers, clients, and other devices not shown. In accordance with a preferred embodiment of the present invention, network data processing system 100 provides a distributed messaging system that supports stateful subscriptions. A subset of clients 122, 124, 126 may be publishing clients, while others of clients 122, 124, 126 may be subscribing clients. Published events may also be generated by one or more of servers 112, 114, 116.

A stateful publish-subscribe system is a distributed messaging system in which at least one subscription is stateful. Other subscriptions may be content-based or, in other words, stateless. A stateful publish-subscribe system must compute information that requires multiple messages of one or more streams. For example, a stateful subscription may request, "Give me the highest quote within each one-minute period." A stateful subscription may entail delivering information other than simply a copy of published messages. For example, a stateful subscription may request, "Tell me how many stocks fell during each one-minute period."

The stateful publish-subscribe system is implemented as an overlay network, which is a collection of service machines, referred to as brokers, that accept messages from publisher clients, deliver subscribed information to subscriber clients, and route information between publishers and subscribers. One or more of servers 112, 114 and 116, for example, may be broker machines. Both content-based and stateful publish-subscribe systems support a message delivery model based on two roles: (1) publishers produce information in the form of structured messages; and, (2) subscribers specify in advance the kinds of information in which they are interested. As messages are later published, relevant information is delivered in a timely fashion to subscribers. Content-based subscriptions are restricted to Boolean filter predicates that can only refer to fields in individual messages. For example, a content-based subscription may request, "Deliver message if traded volume>1000 shares" where the field "traded volume" appears in each message. On the other hand, stateful subscriptions are more general state-valued expressions and may refer to one or more message histories. For example, a subscription may request "Deliver total traded volume by hour for all issues trading a total>10000 shares in that hour". In a content-based publish-subscribe system, because subscriptions can only specify filtering, all published messages are either passed through to subscribers or filtered out. Therefore, messages received by subscribers are identically structured copies of messages published by publishers. In contrast, in a stateful publish-subscribe system, subscriptions may include more complex expressions and, therefore, subscribers may receive information that is not identical to the published messages with different formatting. For example, a published message may have only integer prices, while subscriptions to average prices may have non-integer averages.

Published event streams are associated with topics. Each topic is associated with a base relation. A base relation is a table of tuples, each tuple corresponding to an event. Subscriptions are expressed as view expressions in a relational algebraic language, although other representations may also be used. The language defines a cascade of views of base relations and derived views computed from either base relations or other views. At compile-time, the set of subscriptions is compiled into a collection of objects that are deployed and integrated into messaging brokers. At run-time, publishers and subscribers connect to these brokers. Published events are delivered to objects associated with base relations. The events are then pushed downstream to other objects that compute how each derived view changes based on the change to the base relation. Those derived views associated with subscriptions then deliver events to the subscriber informing the subscriber of each change in state.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
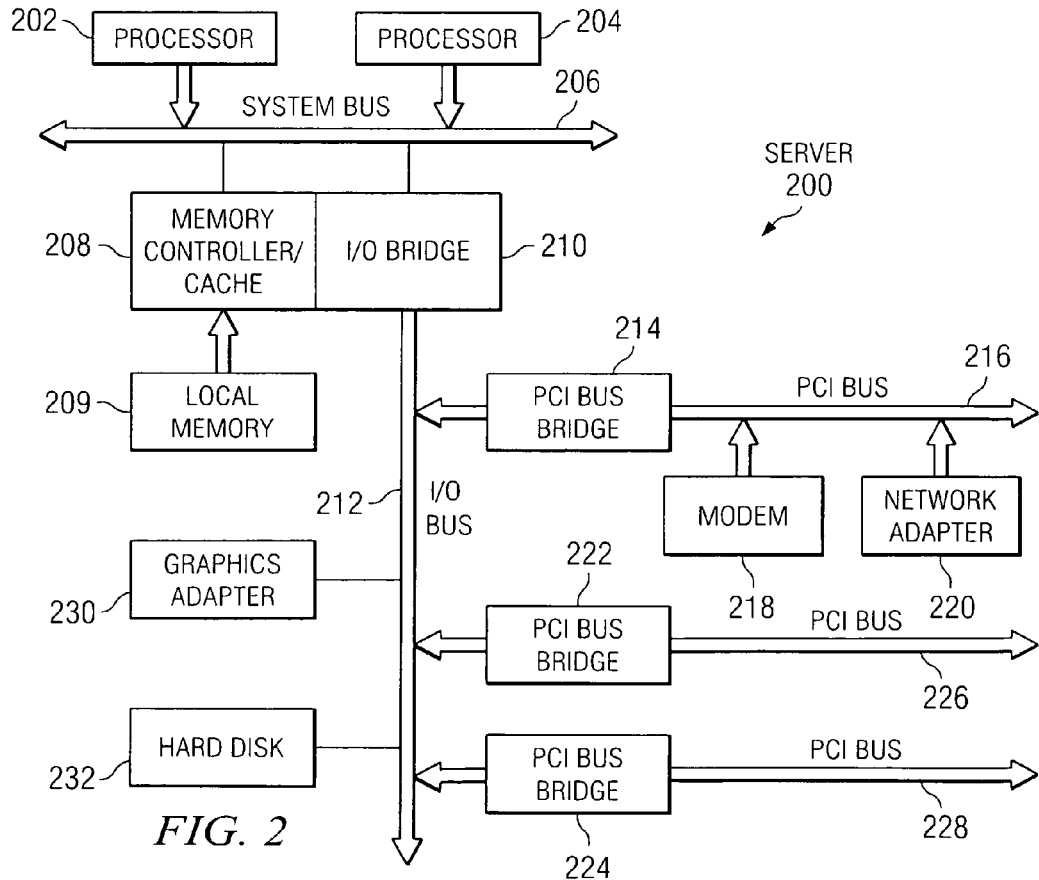
FIG. 2 is a block diagram of a data processing system that may be implemented as a server computer in accordance with a preferred embodiment of the present invention.

Referring to FIG. 2, a block diagram of a data processing system that may be implemented as a server, such as server 112 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 122-126 in FIG. 1 may be provided through modem 218 and network adapter 220 connected to PCI local bus 216 through add-in connectors. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM eServer™ pSeries® system, a product of International Business Machines Corporation in Armonk, N.Y., running the Advanced Interactive Executive (AIX) operating system or LINUX operating system.

Figure 3:
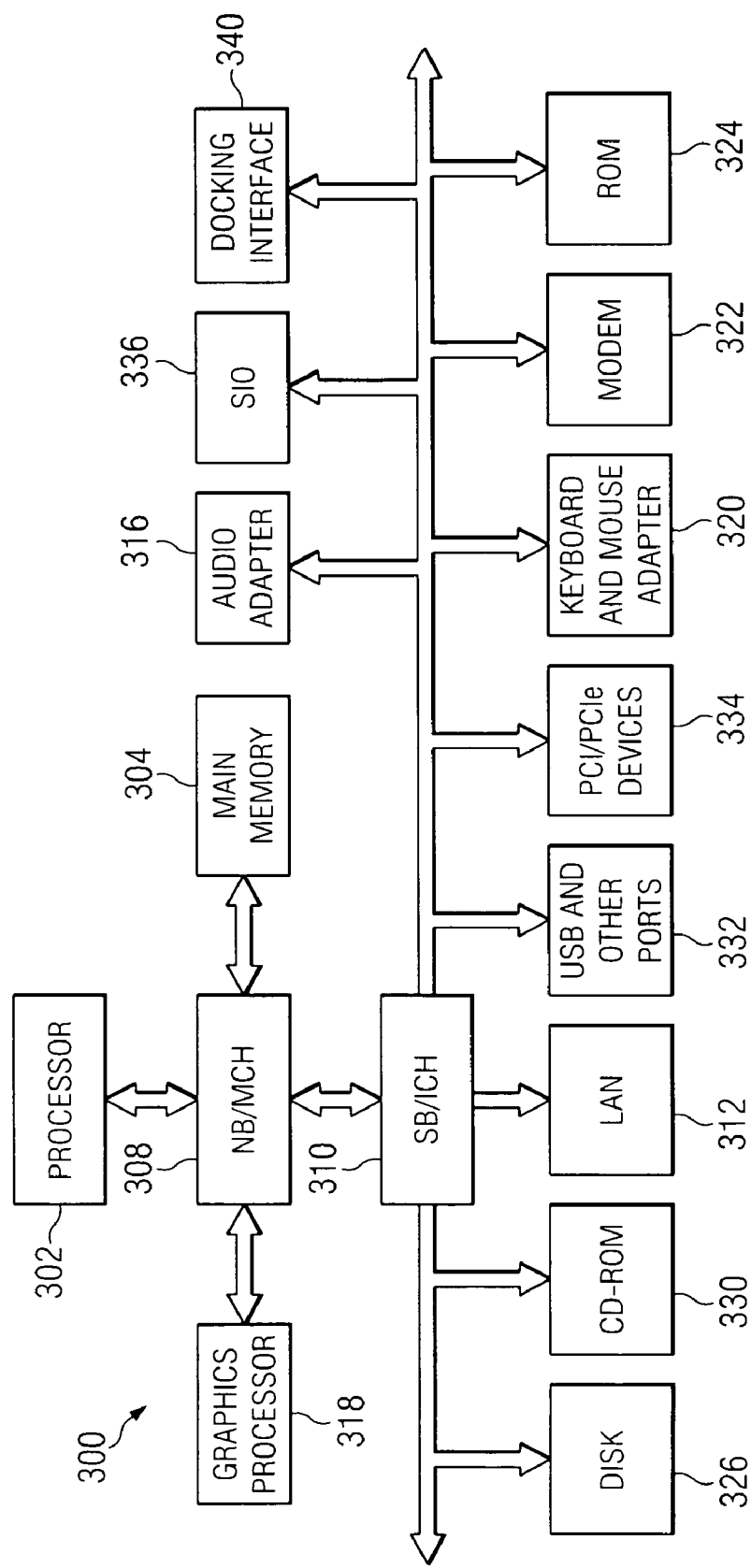
FIG. 3 is a block diagram of a data processing system that might act as a client of the service in which the present invention may be implemented.

With reference now to FIG. 3, a block diagram of a data processing system is shown illustrating a machine that may serve as a client of the service in which the present invention may be implemented. Data processing system 300 is an example of a computer, such as client computer 122 in FIG. 1, in which code or instructions implementing the processes of the present invention may be located. In the depicted example, data processing system 300 employs a hub architecture including a north bridge and memory controller hub (ICH) 308 and a south bridge and input/output (I/O) controller hub (ICH) 310. Processor 302, main memory 304, and graphics processor 318 are connected to MCH 308. Graphics processor 318 may be connected to the MCH through an accelerated graphics port (AGP), for example.

In the depicted example, local area network (LAN) adapter 312, audio adapter 316, keyboard and mouse adapter 320, modem 322, read only memory (ROM) 324, hard disk drive (HDD) 326, CD-ROM driver 330, universal serial bus (USB) ports and other communications ports 332, and PCI/PCIe devices 334 may be connected to ICH 310. PCI/PCIe devices may include, for example, Ethernet adapters, add-in cards, PC cards for notebook computers, etc. PCI uses a cardbus controller, while PCIe does not. ROM 324 may be, for example, a flash binary input/output system (BIOS). Hard disk drive 326 and CD-ROM drive 330 may use, for example, an integrated drive electronics (IDE) or serial advanced technology attachment (SATA) interface. A super I/O (SIO) device 336 may be connected to ICH 310.

An operating system runs on processor 302 and is used to coordinate and provide control of various components within data processing system 300 in FIG. 3. The operating system may be a commercially available operating system such as Windows XP™, which is available from Microsoft Corporation. Instructions for the operating system, and applications or programs are located on storage devices, such as hard disk drive 326, and may be loaded into main memory 304 for execution by processor 302. The processes of the present invention are performed by processor 302 using computer implemented instructions, which may be located in a memory such as, for example, main memory 304, memory 324, or in one or more peripheral devices 326 and 330. Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the present invention may be applied to a multiprocessor data processing system.

In accordance with a preferred embodiment of the present invention, a plurality of broker machines are responsible for delivery of messages sent by publishing clients towards subscribing clients based upon the content of the messages and the stateful transformations requested by the subscribing clients. These broker machines form an overlay network. Some broker machines may be specialized for hosting publishing clients, referred to as publisher hosting brokers (PHBs), and others for hosting subscribing clients, referred to as subscriber hosting brokers (SHBs). Between the PHBs and the SHBs, there may be any number of intermediate nodes that include routing and filtering. The brokers at the intermediate nodes are referred to as intermediate brokers or IBs. For expository purposes, this separation is assumed; however, in actual deployment, some or all of the broker machines may combine the functions of a PHB, an SHB and/or an IB.

Figure 4:
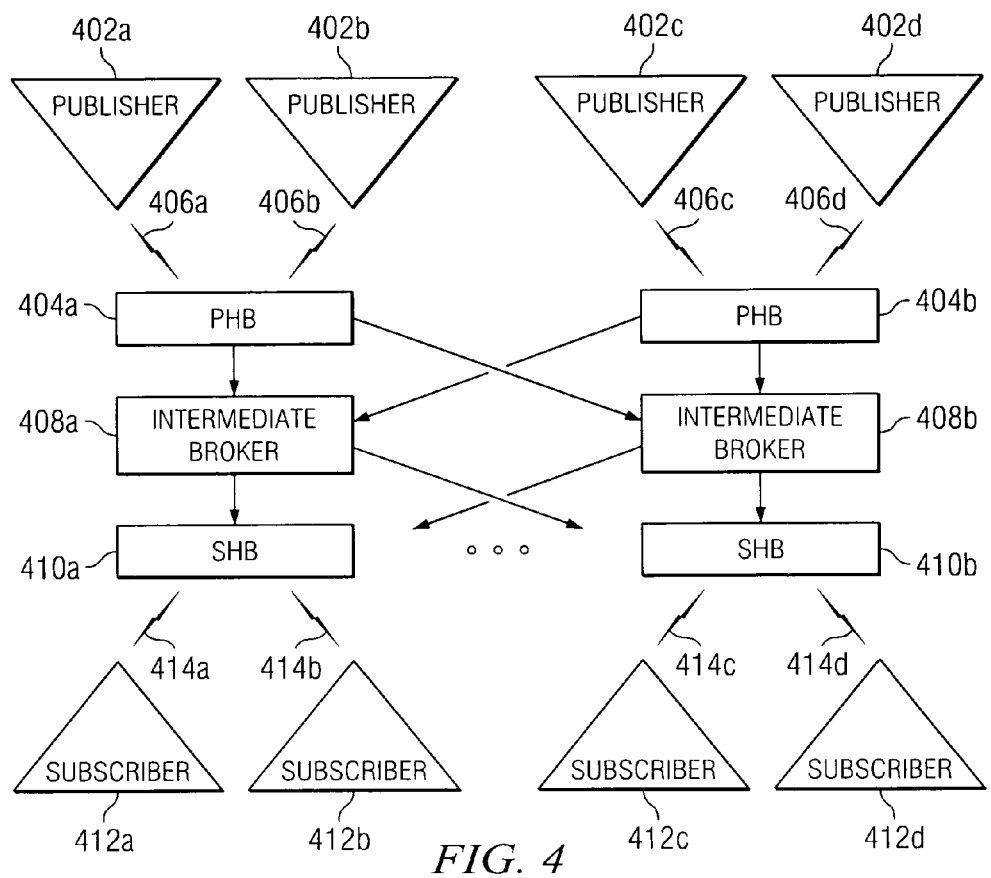
FIG. 4 is a diagram of a broker network for a stateful publish-subscribe system in accordance with a preferred embodiment of the present invention.

FIG. 4 is a diagram of a broker network for a stateful publish-subscribe system in accordance with a preferred embodiment of the present invention. A publishing client, such as one of publishers 402a-402d, establishes a connection to a PHB, such as PHB 404a or PHB 404b, over a corresponding one of client connections 406a-406d. The client connections may, for example, be a first-in/first-out (FIFO) connection, such as a Transmission Control Protocol/Internet Protocol (TCP/IP) socket connection, or another suitable connection. Independently, a subscribing client, such as one of subscribers 412a-412d, establishes a connection to an SHB, such as SHB 410a or SHB 410b, over a corresponding one of client connections 414a-414d, which may be similar to client connections 406a-406d. The PHBs and SHBs are connected, via intermediate brokers 408a-408b, through broker-to-broker links. As will be described more fully hereinafter, a publish-subscribe system in accordance with the present invention includes a fault-tolerant protocol that tolerates link failures and message re-orderings. Accordingly, in the publish-subscribe system of the present invention it is not necessary for the broker-to-broker connections to use reliable FIFO protocols, such as TCP/IP, but may, when it is advantageous to do so, use faster, less reliable protocols. Each broker machine may be a stand-alone computer, a process within a computer, or, to minimize delay due to failures, a cluster of redundant processes within multiple computers. Similarly, the links may be simple socket connections, or connection bundles that use multiple alternative paths for high availability and load balancing.

Figure 5:
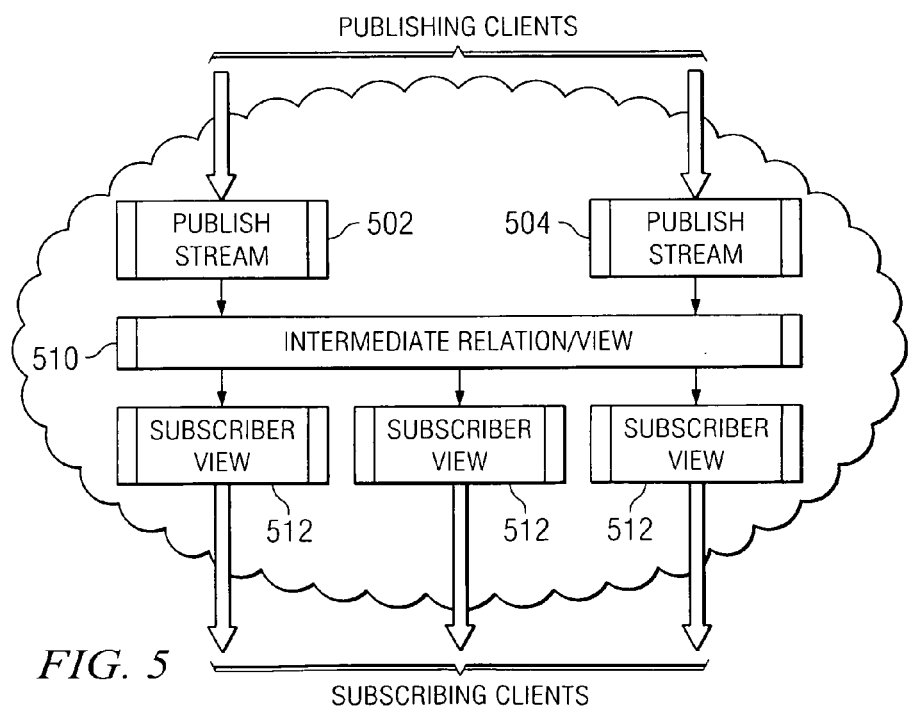
FIG. 5 is a diagram that illustrates how a stateful publish-subscribe system appears to publisher and subscriber clients in accordance with a preferred embodiment of the present invention.

FIG. 5 is a diagram that illustrates how a stateful publish-subscribe system appears to publisher and subscriber clients in accordance with a preferred embodiment of the present invention. Clients are unaware of the physical broker network or its topology. A client application may connect to any broker in the role of publisher and/or subscriber. Publishing clients are aware only of particular named published event streams (topics), such as publish streams 502 and 504. Multiple clients may publish to the same published event stream (topic).

Administrators and clients may define derived views based on functions of either published event streams or of other derived views. In the depicted example, published event streams may be represented as relations. Derived views are represented as relations derived from published event streams or from other derived views by means of relational algebraic expressions in a language, such as Date and Darwen's Tutorial-D, Structured Query Language (SQL), or XQUERY. For example, derived view 510 is defined as a function of stream relations 502 and 504 by means of a JOIN expression with relations 502 and 504 as inputs and relation 510 as an output. Similarly, relation 512, indicated as a subscriber view, is derived from relation 510 by client-specified relational expressions. For example, subscriber view 512 may be a request to group the stock trades of relation 510 by issue and hour and compute the running total volume and max and min price for each issue-hour pair.

Each subscribing client subscribes to a particular derived view. As published events enter the system from publishing clients, they are saved in their respective streams. The system is then responsible for updating each derived view according to the previously specified relational expressions and then delivering client messages to each subscriber representing the changes to the state of the respective subscribed view.

In a preferred embodiment of the present invention, subscription specifications are analyzed by a compiler and converted into a collection of transform objects and view objects. In one embodiment, the compiler generates JAVA classes for transform and view objects, which are then packaged into an archive (JAR) file, uploaded to the appropriate brokers, and instantiated. Each operator that derives a view from one or more inputs corresponds to a transform object. Each view corresponds to a view object. View objects hold the state of a view. Transform objects express the logic for incrementally updating an output view constituting the result of an operator in response to individual changes to input views constituting the arguments to that operator.

Figure 6:
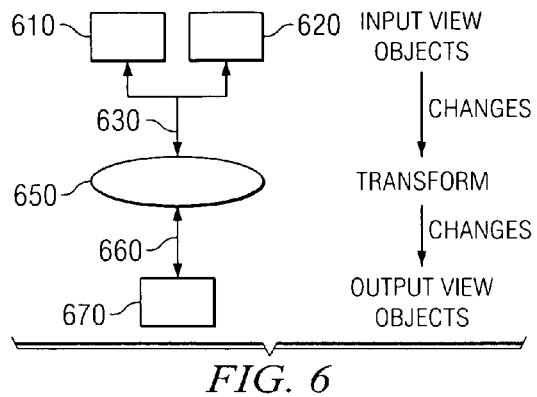
FIG. 6 is a diagram that illustrates an example of an operator that transforms two input view objects to an output view object in accordance with a preferred embodiment of the present invention.

FIG. 6 illustrates an example of an operator that transforms input view objects to an output view object in accordance with a preferred embodiment of the present invention. In the depicted example, views 610 and 620 are view objects that are inputs to some operator, such as, for example, a JOIN operator. Transform 650 is a transform object for that operator, which produces a derived view shown as view object 670. When one of the input objects 610 or 620 changes, either because it itself is a published input stream or because it is a derived view that has changed as a result of changes to its inputs, messages reflecting the changes are sent to transform object 650. Transform 650 receives the messages representing changes to its inputs 610, 620, computes how the result of the operator changes given the announced changes it has received, and then delivers the computed results to its output view object 670 in the form of change messages. Output view object 670 then propagates in its turn such change messages, either to further transforms, if view object 670 is an intermediate view, or to subscribers, if view object 670 is a subscriber view. Under failure-free circumstances, all message flows are in the "downstream" direction, that is, from inputs toward transforms, and from transforms toward objects. Exceptionally, view objects such as view object 670 will detect, using protocols discussed hereinafter, that information is missing as a result of failures causing message loss. In such cases, messages, referred to as "curiosity" messages will flow in the upstream direction, that is, from output view objects toward transform objects and from transform objects toward input view objects, in order to request the re-sending of these missing messages.

FIG. 6 is a diagram that illustrates an example of an operator that transforms two input view objects to an output view object in accordance with a preferred embodiment of the present invention. When subscriptions are entered, the mechanism of the present invention builds a structure containing all of the transform objects and view objects needed for all intermediate and subscribed views of all subscriptions. This structure is called a dataflow hypergraph. The dataflow hypergraph has nodes corresponding to each view object and hyperedges, which may possibly have more than one input feeding an output, representing each transform object associated with an operation in the subscription specification.

The view objects and transform objects are then allocated to actual brokers in the overlay network, either manually by an administrator or automatically via a service, such as the one described in co-pending application entitled "CONTINUOUS FEEDBACK-CONTROLLED DEPLOYMENT OF MESSAGE TRANSFORMS IN A DISTRIBUTED MESSAGING SYSTEM", Ser. No. 10/841,297, filed on May 7, 2004. The published streams and the subscribed views may be constrained to be located on brokers where the publishers and subscribers actually connect. The placement of the intermediate transform objects and view objects is not constrained. That is, intermediate transform objects and view objects may be placed wherever suitable, taking into consideration the capacities of the broker machines and the links, as well as the desired performance. After such allocation of objects to brokers, the result is a distributed dataflow hypergraph.

Figure 7:
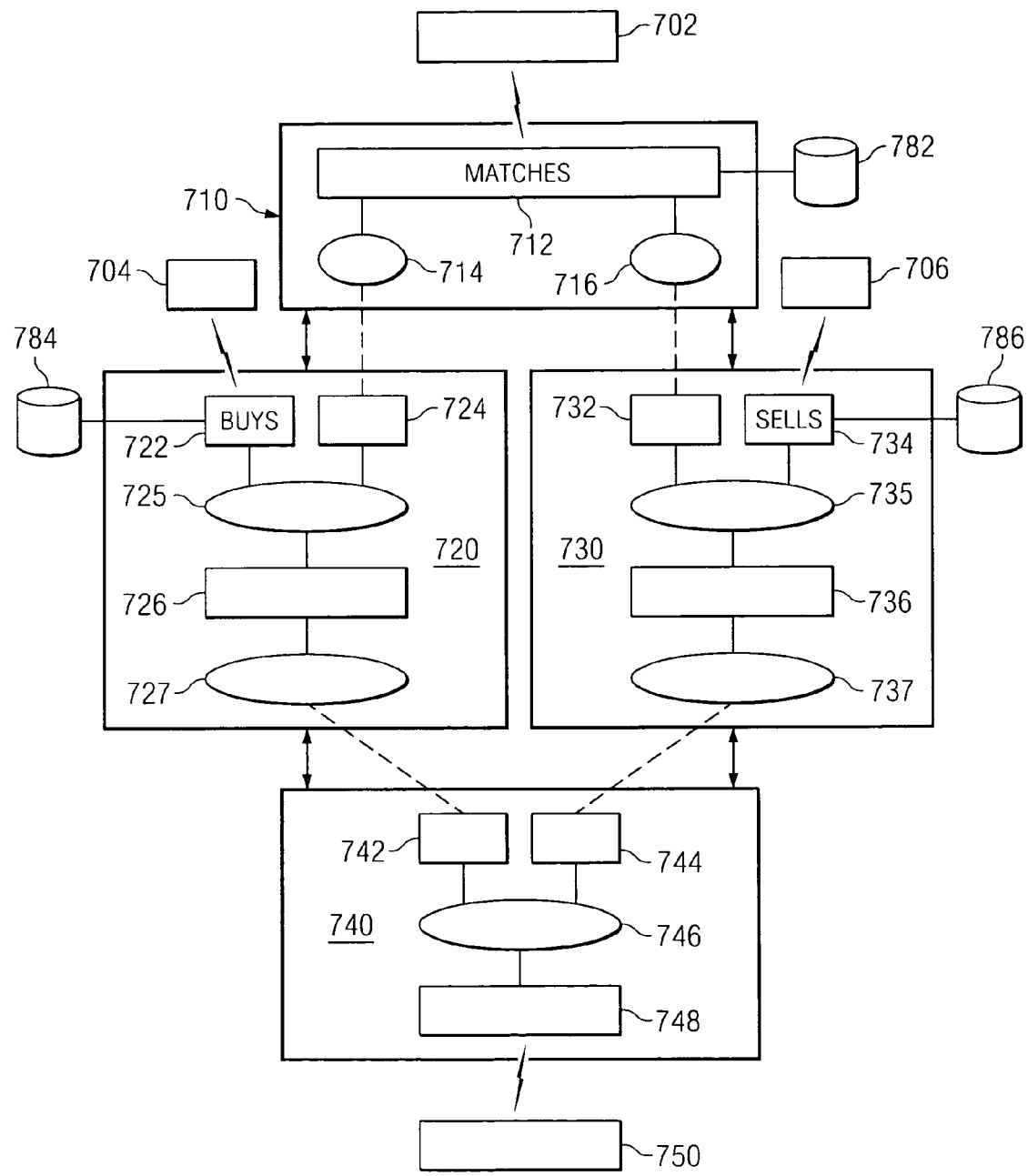
FIG. 7 is a diagram that illustrates a dataflow hypergraph, distributed over multiple brokers in accordance with a preferred embodiment of the present invention.

FIG. 7 is a diagram that illustrates a dataflow hypergraph, distributed over multiple brokers in accordance with a preferred embodiment of the present invention. In the depicted example, the physical network consists of brokers 710, 720, 730, and 740. There are three publishing clients 702, 704, and 706, and one subscribing client 750. The publishing clients are publishing to three separate published message streams: "buys" 722 on broker 720, "sells" 734 on broker 730, and "matches" 712 on broker 710. The subscribing client 750 subscribes to derived view 748 on broker 740.

Broker 710 also includes transforms 714 and 716, which feed change messages to brokers 720 and 730, respectively. Broker 720 includes view objects 724 and 726 and transform objects 725 and 727. As an example, view object 726 represents an intermediate derived view or relation, which is based on transform 725, published stream 722, and view 724. Broker 730 includes views 732 and 736, in addition to published stream 734, and also includes transforms 735, 737. Broker 740 includes views 742, 744 and 748, and transform 746. View 748 is a subscriber view for subscriber 750. As stated above, multiple publisher clients may provide messages for a single message stream, and multiple subscriber clients may subscribe and receive updates from the same view.

As shown in FIG. 7, the transform graph consists of multiple transform and view objects distributed over all brokers. The paths between objects will sometimes lie within a broker, as is the case between transform object 725 and intermediate view object 726. In other cases, such as the path between transform 727 and intermediate view object 742 (shown with a dotted line), the path must cross over an inter-broker link. It is understood that the within-broker communications between objects may use cheaper communications formats, such as parameter passing between objects, however, inter-broker communications requires generating physical messages or packets that will cross the link. In accordance with a preferred embodiment of the present invention, the protocols of all view objects and transform objects will be able to recover from lost, out-of-order, or duplicate messages, and, therefore, will work correctly regardless of which paths between objects cross broker boundaries and which do not.

In order to support stateful subscriptions, a history of states is stored in a data storage device. For example, messages from the "matches" published stream 712 are stored in storage 782, messages from the "buys" published stream 722 are stored in storage 784, and messages from the "sells" published stream 734 are stored in storage 786. Storage 782, 784 and 786 should be a persistent storage, such as a hard drive, capable of recovering published messages should broker 710, 720 or 730 crash and be restarted. In a system guaranteeing reliable service, published messages will be logged to persistent storage before being propagated. Other states, such as views 742, 744, are preferentially stored in main memory and are not required to be stored persistently. As was described above, the term "downstream" refers to the direction along the hypergraph of FIG. 7 from input streams towards subscribers; and the term "upstream" refers to the opposite direction from a subscribed or intermediate view object back towards the input streams or towards intermediate views used to compute them.

In accordance with a preferred embodiment of the present invention, the state represented in each view object is represented by a value in a monotonic domain. A monotonic domain is a set of values that can be put into a partial order. In the present invention, if a value B succeeds a value A in the partial order, this means that value B contains more information than value A. For example, value B might be a property of a total stock volume that says the total is at least 100; and value A might be the property that says the total is at least 50. A critical property of monotonic domains is that they change only in one direction: from less knowledge to more knowledge. The monotonic domains begin from a bottom state, which is a state of total ignorance. In the example given above of total stock volume, the bottom state is the state that the total stock volume is at least 0.

Figure 8:
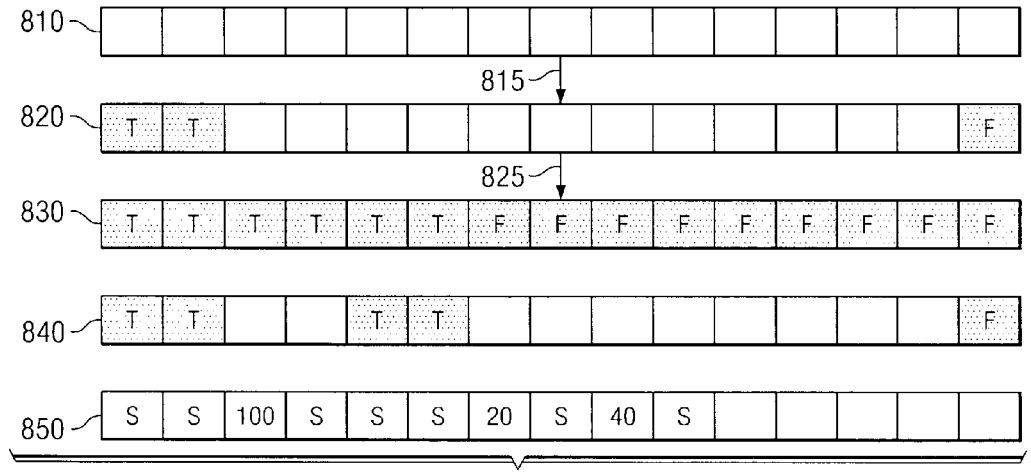
FIG. 8 is a pictorial representation of a monotonic domain illustrating the manner in which information gaps are detected in accordance with a preferred embodiment of the present invention.

Every monotonic domain can be represented as a collection of cells that are initially empty and that become filled in over time. Once a cell is filled, it cannot change value. FIG. 8 is a pictorial representation of a monotonic domain illustrating the manner in which information gaps are detected in accordance with a preferred embodiment of the present invention. FIG. 8 illustrates a very simple monotonic domain representing a computed value that can take a range of from 0 to 15. Initially, as shown in state diagram 810, all cells are blank, representing that nothing is known other than that the value is in the range of 0-15. A later state of the same object occurs if new pieces of knowledge are added. In state diagram 820, two new pieces of knowledge have been added indicating that the value is at least 2 and no more than 14. The new knowledge is indicated in this illustrative example by the first two cells being marked with "T" (True) and the last cell being marked with "F" (False). Arrow 815 indicates that state 810 has evolved to state 820 as a result of the marking of the appropriate cells.

In a still later state, illustrated in state diagram 830, more knowledge has been added indicating that the value is exactly 6. Thus, in state 830, the first 6 cells are marked with T and the last 9 cells are marked with F. Arrow 825 indicates that state 820 has further evolved to state 830 as a result of the marking of additional cells. At this point, no further cells can be filled in and the state can no longer change. State 830, accordingly, is a "final" state. Every state maintained in accordance with a preferred embodiment of the present invention is from some monotonic domain, the exact domain depending upon the operator that generated the state. It is understood that FIG. 8 represents a mathematical example of a simple domain. An efficient representation will typically represent a range with a pair of integer cells, provided that the processing of updates proceeds in a manner consistent with the mathematical model.

It is to be noted that the cells can only be filled in a particular order. In the example illustrated by states 810-830, the cells can only be filled with consecutive T's beginning on the left or with consecutive F's beginning on the right. Adding values in the wrong order, for example, as illustrated in state diagram 840, is immediately detectable as a "gap" and serves as an indication either that messages have arrived in the wrong order, or that a message has been lost and might not arrive at all. The combination of monotonic domains, incremental filling of cells, and ordering rules for filling the cells to permit gap detection, permit detection of and recovery from failures in a stateful publish-subscribe system in accordance with a preferred embodiment of the present invention.

The monotonic domain used for published input streams in accordance with a preferred embodiment of the present invention is always the same; namely, a set of cells labeled by "ticks" of time. Ticks in the future are blank, representing the fact that it is unknown whether those ticks will contain events and if so what the values of these events will be. Ticks in the past are filled; either with an event value, or with a silence. State 850 in FIG. 8 represents a particular state after 10 ticks have elapsed.

The monotonic domains used herein for derived views are based on analysis of the operators that generate the views. For example, a view that sums a set of K tuples each of which can have a value from 0 to M, produces a range from 0 to K*M. The example of the 0 to 15 range shown in the monotonic domain of FIG. 8 could result from such a case where K=5 and M=3.

When messages enter the publish-subscribe system as part of some published stream, they are logged to stable storage. For example, in FIG. 7, messages from client 710 to published stream Matches 712 are logged to storage 782. The view objects associated with published streams such as Matches 712 are now stable and never have missing messages. These messages are available even if the PHB fails. Downstream view objects, such as 724, or 742, which depend for their updates on messages that have to cross broker boundaries over links, may contain missing messages. The following describes the manner in which view objects other than the published stream view objects detect and recover from failures.

The general protocol in accordance with a preferred embodiment of the present invention is the same for all view objects other than the published stream view objects. There exist particular specializations of this general protocol based on the actual operation used.

Consider a view object that is not a published stream view object, for example, view object 742 in FIG. 7. Each view object has an associated transform object that feeds it input. When the transform object, transform object 727 in the case of view object 742, receives an update from its input or inputs (726 in this example), it computes the change to the view object, and passes the change to that view object, which then performs the method illustrated in FIG. 9.

Figure 9:
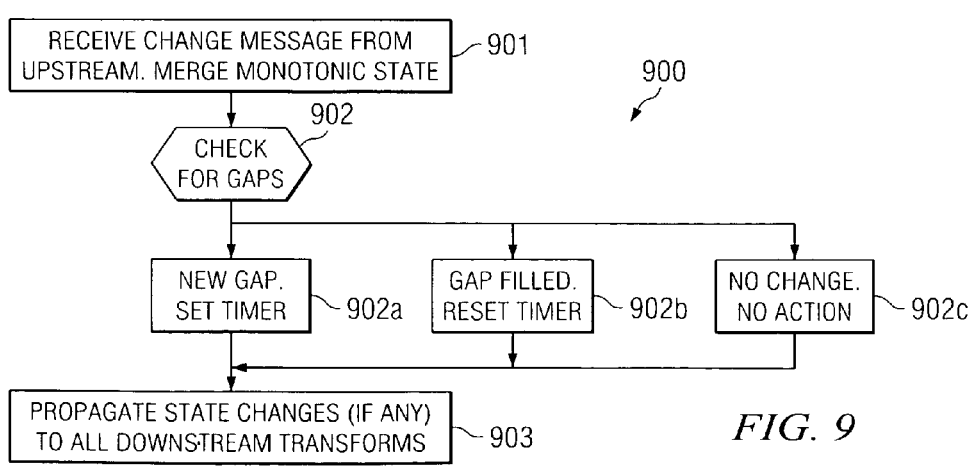
FIG. 9 is a flowchart that illustrates a method for responding to state change messages in accordance with a preferred embodiment of the present invention.

In particular, FIG. 9 is a flowchart that illustrates a method for responding to state change messages in accordance with a preferred embodiment of the present invention. The method is generally designated by reference number 900, and begins when a change message is received indicating which new cells in the monotonic domain are to be filled, and the new cells are filled in accordance with the message (step 901). The particular monotonic domain will depend upon the actual operators. The new state is obtained by merging the changed cells with the original cells. Mathematically, this is called taking the greatest upper bound of the old and new values. For example, suppose the domain is the one shown in FIG. 8 as domains 810-840. Suppose also that the current state is the state shown in 840. The following are possible cases:

a. (Usual) The change message requests that cells 3-5 be filled with T and that cells 10-14 be filled with F. This is a typical case where the value moves to a later value, namely transitioning from the range extending from 2 to 14 to the range extending from 5 to 9.

b. (Duplicate) The change message requests that cell 1 be filled with T and that cell 15 be filled with F. These cells are already filled. Therefore, the new state is the same as the old state and the message is, in effect, ignored and treated as a duplicate. (The discussion below indicates a circumstance in which duplicates might occur as a result of retransmitting messages which were delayed but not lost.)

c. (Gap) The change message requests that cells 5-6 be filled with T. This yields a value such as the value shown in state 840, containing a gap. The gap is an indication that some message has probably been lost. Either some messages have been swapped during transit over the link, or some message has been lost and will need to be recovered.

After updating the state in step 901, a check is conducted to determine if any gaps exist in the new state (step 902). One of three results will be detected:

a. A gap has arisen where there previously was no gap. In this case, a timer service is invoked (step 902a). If some threshold number of milliseconds has elapsed and the timer has not been cancelled, an alarm will be raised.

b. A gap has been closed where there was previously a gap. In this case, the timer is cancelled (step 902b).

c. If there has been no change with regard to gaps, no further action is taken (step 902c).

In all of the above three results, state changes, if any, are propagated further to all transform objects that are downstream of this view object (step 903).

From time to time, the above-described protocol will result in an alarm being generated indicating that a gap was detected in step 902a and not filled quickly enough. When an alarm is generated, the view object detecting the gap becomes a "curious view". The view object will notify its associated transform object, and the transform object will decide, based on the transform, exactly what kind of information it is missing and, in some cases, from which of its multiple arguments it is missing this information. The transform object will then send an inquiry message, also referred to as a "curiosity message" upstream toward the view object or objects that might be able to supply the missing information. Each such view object receiving a curiosity message becomes a "satisfying view". The satisfying view responds to the curiosity message by resending the requested information if it has it; otherwise the satisfying relation itself becomes curious and curiosity messages are propagated further upstream. If the satisfying view is logged to stable storage, it will always be able to satisfy curiosity and will never need to propagate curiosity messages. As mentioned previously, this is guaranteed to occur in the case of the published stream views. Therefore ultimately, missing information is retransmitted from satisfying relations back towards curious relations.

It is possible that the messages conveying the missing information were merely delayed and not lost. In such a case, either the messages or the retransmissions from the satisfying view will turn out to be duplicates. However, the protocol in accordance with the present invention tolerates duplicate messages from links by simply ignoring them (This occurs in step 901 in FIG. 9, where the merge operation described above is encountered-case (b) "Duplicate"). Duplicate messages, accordingly, do not present a problem.

It is necessary to set a second timer when a curious view sends a curiosity message. This timer will trigger an alarm if the gap is not satisfied within a designated timeout period. If the timer times out before the gap is filled, the curiosity message will be resent. This protocol is necessary to deal with the possibility of the curiosity message itself being lost. The protocol assumes that curiosity messages and their responses will not be infinitely often lost; that is, that if one waits long enough, there will be a stable period of connectivity between a broker and its nearest neighbor.

An example of a view relation and the particular monotonic type it uses and the particular representations used to hold the state, detect gaps, and issue curiosity will now be given with reference to FIG. 10 which is a diagram that illustrates the results of a stateful transformation in accordance with a preferred embodiment of the present invention. This relation is the result of taking a stock ticker showing tick number, issue, price, and number of shares sold, and applying an operator that groups the ticker by issue, and delivering the total volume (totalvol) of shares sold for each issue.

The state of this view object is shown in two components: (1) a relation keyed by issue, and mapping to the total volume and the tick number of the latest update, and (2) a gap data structure recording which ticks from the original stock ticker have or have not contributed to the sum being stored—the information having three components: a past horizon $t_1$, a future horizon $t_2$, and a gap list. In FIG. 10, object 1001 shows a typical value of the relation, and objects 1002 and 1003 show possible alternative values of the gap data structure.

The change messages have one of the following three forms:

Update (i, v, t) represents the fact that the volume for the issue has increased to v as of tick t.

Silence (t1, t2) represents the fact that silences occurred in the tick range t1 to t2. In order to distinguish between event streams that have quiesced and link failures, the implementation requires that after a certain period with no change, silence messages for that time interval should propagate. In a typical implementation, silence messages are normally "piggybacked" on the neighboring update messages, and only sent in isolation when a long enough interval has elapsed without any update messages having been sent.

Don't-Care (t1, t2) represents the fact that the values for all issues in this range can be ignored (because it is known that an update for a time later than t2 exists).

The meaning of the relation is as follows: the "issue" and "totalvol" columns represent values that a viewer of the relation would actually see; the "t" column is used to record at which ticks these values reached their current value, and is used to facilitate the response to curiosity messages.

The meaning of the gap data structure is as follows: horizon $t_1$ represents the fact that the totals in all rows include the summations including all ticks up to and including $t_1$. Horizon $t_2$ represents the fact that the totals in all rows do not include any ticks from $t_2$ on. In the normal case, where there are no messages lost, $t_2=t_1+1$. When $t_2$ does not equal $t_1+1$, there are one or more gaps. The gap-list indicate which ranges of ticks between $t_1$ and $t_2$ are included (flagged with 'T') or not included (flagged with '*') in the summations for all rows.

Figures 10, 11:
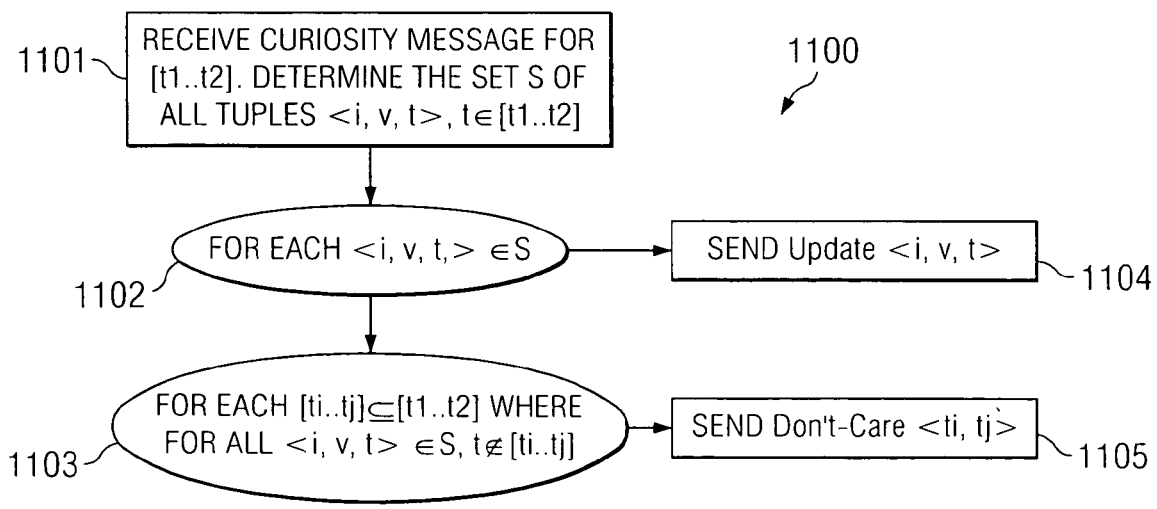
FIG. 10 is a diagram that illustrates the result of a stateful transformation in accordance with a preferred embodiment of the present invention.
FIG. 11 is a flowchart that illustrates a method for processing a curiosity message from a downstream object in accordance with a preferred embodiment of the present invention.

In FIG. 10, object 1002 represents a possible state of the gap data structure in which all the ticks from 0 through 9500 have been counted towards the summations, no ticks from 9501 on have been counted, and there are, therefore, no gaps. Object 1003 represents a possible state of the gap data structure in which ticks from 0 through 9500 and 9551 through 9600 have been counted, no ticks from 9601 on have been counted, but ticks in the range 9501 through 9550 are unaccounted for. Such a state would constitute a gap, and if the gap persists, the relation would become curious.

When processing a message, the tick range of the message is examined. If the tick range includes ticks that have already been counted, the already counted ticks are ignored. If the tick range includes ticks that have not previously been counted, the gap list is adjusted by possibly eliminating a gap, possibly creating a gap or possibly just extending the future horizon. In this manner, the data structure of the example is a specialization of the general protocol illustrated in FIG. 9.

If, in the data structure of FIG. 10, a gap persists for longer than the timeout interval, then the view represented by the data structure becomes curious, and a curiosity message is sent upstream. Suppose the view object upstream has a similar structure to FIG. 10. The curiosity message will request messages for a particular range or ranges of ticks, one range of ticks for each persistent gap. FIG. 11 is a flowchart that illustrates a method by which a satisfying relation responds to a curiosity message from a downstream curious view object in accordance with a preferred embodiment of the present invention.

The method is generally designated by reference number 1100. The satisfying relation begins by receiving the curiosity message for t1 ... t2, and finding the set S of all tuples <i, v, t> of the relation for which the value of column t falls within the range (step 1001). For each such row (step 1102), the satisfying relation sends an Update message to the curious relation with the specified <i, v, t> (step 1104). For each distinct interval $t_i \ldots t_j$ within range t1 ... t2 that does not include a tick named in a row of S (step 1103), the satisfying relation sends a Don't-Care message to the curious relation, specifying the interval $t_i \ldots t_j$ (step 1005).

The result of this algorithm is that if there have been multiple updates to some stock issue during the interval t1 ... t2, only one update is sent, specifically, the update that led to the highest value. This update will supersede all previous updates, and previous updates need not be sent. This algorithm provides an advantage over algorithms that are not aware of the mathematical properties of the transforms, and that merely replay all messages. Such algorithms are used, for example, in "guaranteed delivery" systems for stateless publish-subscribe services.

The present invention thus provides a fault-tolerant protocol for a distributed stateful publish-subscribe system. The system includes the capability of recovering from failures that may occur when a stateful publish-subscribe service is implemented on an overlay network. Such failures may include, for example, temporary crashes of broker machines, and network errors causing messages to possibly be lost, duplicated or delivered out of order. The system requires stable storage logging only when a published event enters the system, and requires that logged messages be retrieved from stable storage only in the event all brokers between a failed link or broker and the publishing sites have failed. The publish-subscribe system of the present invention does not require that broker-to-broker connections use reliable FIFO protocols, such as TCP/IP, but may advantageously use faster, less reliable protocols.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for fault recovery in a stateful publish-subscribe system, the method comprising:

providing the stateful publish-subscribe system, the system including an overlay network, wherein the overlay network comprises a publisher that first transmits a plurality of structured messages through the overlay network, an object downstream from the publisher that receives the plurality of structured messages as a plurality of input messages from the publisher and applies at least one transform to the plurality of input messages to form at least one output message that is transmitted to a subscriber downstream from the object, and the subscriber that receives the at least one output message from the object;

storing a history of the plurality of structured messages in a stable storage at the publisher;

detecting missing information with respect to a message transmitted downstream through the overlay network from the plurality of input messages to the at least one output message, wherein view objects using protocols detect the missing information, wherein the view objects are represented by a set of values in a monotonic domain, wherein the monotonic domain is the set of values in a partial order, wherein detecting the missing information with respect to a message includes detecting a gap in the set of values, and wherein the gap is an indication that the message is lost or not arrived at all;

transmitting an inquiry message requesting the missing information upstream through the overlay network to the object;

determining whether the missing information is stored in the object using the inquiry message;

responsive to a determination that the missing information is stored in the object, responding to the inquiry message by reapplying the at least one transform to the missing information and transmitting the missing information downstream through the overlay network;

responsive to a determination that the missing information is not stored in the object, transmitting the inquiry message from the object to the publisher;

responding to the inquiry message by retrieving the missing information from the plurality of structured messages in the stable storage at the publisher and transmitting the missing information from the publisher downstream through the overlay network.

2. The method according to claim 1, wherein the system includes a hypergraph defining at least one transform object and at least one view object deployed over the overlay network, and wherein transmitting an inquiry message upstream through the overlay network comprises transmitting an inquiry message upstream through the overlay network from object to object until the missing information is determined.

3. The method according to claim 2, wherein the plurality of input messages are logged to a storage, and wherein transmitting an inquiry message upstream through the overlay network from object to object comprises transmitting an inquiry message upstream from object to object until the missing information is determined or until the inquiry message is transmitted to the storage.

4. The method according to claim 1, and further including invoking a timer when missing information is detected with respect to a message transmitted downstream through the overlay network, and wherein transmitting an inquiry message upstream through the overlay network is performed when the invoked timer has elapsed.

5. The method according to claim 1, wherein the steps of detecting missing information, transmitting an inquiry message and receiving and responding to the inquiry message are tailored to mathematical properties of individual transforms.

6. The method of claim 1, wherein the publisher is located on a first computer, the object is located on a second computer, and the subscriber is located on a third computer.

7. The method of claim 6, wherein the plurality of structured messages are transmitted from the publisher to the object using a connection bundle with a plurality of alternative paths.

8. The method of claim 1, wherein applying the at least one transform further comprises:
grouping a plurality of stock trades stored in plurality of structured messages by a stock issue and an hour.

9. The method of claim 8, wherein applying the at least one transform further comprises:
computing a total volume, a maximum price, and a minimum price for the stock issue during the hour.

10. The method of claim 1, further comprising:
distributing, by a service, the at least one transform within the overlay network.

11. The method of claim 1, wherein the step of storing the history of the plurality of structured messages in the stable storage is performed prior to the publisher first transmitting the plurality of structured messages through the overlay network.

12. The method of claim 1, wherein the at least one output message is ignored by the subscriber when the at least one output message is duplicative.

13. The method of claim 1, wherein the step of transmitting the inquiry message from the object to the publisher further comprises:
determining whether the missing information has been received by the object within a time period;
responsive to the missing information not being received by the object within the time period, retransmitting the inquiry message from the object to the publisher.

14. The method of claim 1, wherein the step of retrieving the missing information from the plurality of structured messages in the stable storage at the publisher comprises:
retrieving a structured message with a highest value in the gap in the set of values from the plurality of structured messages in the stable storage at the publisher.

15. A stateful publish-subscribe system comprising:
an overlay network having a plurality of broker machines;
at least one publishing client that publishes a plurality of messages to a plurality of published message streams;
at least one intermediate client that receives the plurality of messages and applies at least one transform to the plurality of messages to form at least one output message that is transmitted to at least one subscribing client downstream from the intermediate client;
at least one subscribing client that requests a view of the at least one output message, wherein at least one of the at least one subscribing client requests a stateful view in which at least one update to the stateful view depends upon more than one of the at least one output message;
a hypergraph defining transform objects and view objects deployed over the overlay network;
a stable storage for storing the plurality of messages at the publishing client;
a first protocol for detecting missing information using the view objects with respect to a message transmitted downstream through the overlay network, wherein the view objects are represented by a set of values in a monotonic domain, wherein the monotonic domain is the set of values in a partial order, wherein detecting the missing information with respect to a message includes detecting a gap in the set of values, and wherein the gap is an indication that the message is lost or not arrived at all;
a second protocol for transmitting an inquiry message requesting the missing information upstream through the overlay network to the at least one intermediate client;
a third protocol for determining whether the missing information is stored in the at least one intermediate client using the inquiry message;
a fourth protocol for, responsive to the third protocol determining that the missing information is stored in the at least one intermediate client, receiving and responding to the inquiry message by reprocessing the missing information using the transform objects, and transmitting the missing information downstream through the overlay network;
a fifth protocol for, responsive to the third protocol determining that the missing information is not stored in the at least one intermediate client, transmitting the inquiry message from the at least one intermediate client to the at least one publishing client;
a sixth protocol for responding to the inquiry message by retrieving the missing information from the plurality of structured messages in the stable storage at the publishing client and transmitting the missing information from the publishing client downstream through the overlay network.

16. A computer program product comprising:
a computer recordable-type medium including computer usable program code for fault recovery in a stateful publish-subscribe system, the computer program product comprising:
computer usable program code for providing the stateful publish-subscribe system, wherein the overlay network comprises a publisher that first transmits a plurality of structured messages through the overlay network, an object downstream from the publisher that receives the plurality of structured messages as a plurality of input messages from the publisher and applies at least one transform to the plurality of input messages to form at least one output message that is transmitted to a subscriber downstream from the object, and the subscriber that receives the at least one output message from the object;
computer usable program code for storing a history of the plurality of structured messages in a stable storage at the publisher;

computer usable program code for detecting missing information with respect to a message transmitted downstream through the overlay network from the plurality of input messages to the at least one output message, wherein view objects using protocols detect the missing information, wherein the view objects are represented by a set of values in a monotonic domain, wherein the monotonic domain is the set of values in a partial order, wherein detecting the missing information with respect to a message includes detecting a gap in the set of values, and wherein the gap is an indication that the message is lost or not arrived at all;

computer usable program code for transmitting an inquiry message requesting the missing information upstream through the overlay network to the object;

computer usable program code for determining whether the missing information is stored in the object using the inquiry message;

computer usable program code for responding to the inquiry message by reapplying the at least one transform to the determined missing information and transmitting the missing information downstream through the overlay network in response to a determination that the missing information is stored in the object;

computer usable program code for transmitting the inquiry message from the object to the publisher in response to a determination that the missing information is not stored in the object;

computer usable program code for responding to the inquiry message by retrieving the missing information from the plurality of structured messages in the stable storage at the publisher and the missing information from the publisher downstream through the overlay network.

* * * * *